(12) United States Patent
Sakai

(10) Patent No.: US 6,250,690 B1
(45) Date of Patent: Jun. 26, 2001

(54) EXPANSION FLEXIBLE TUBE JOINT AND ASSEMBLING METHOD THEREOF

(75) Inventor: Kosuke Sakai, Kobe (JP)

(73) Assignee: Waterworks Technology Development Organization Co., Ltd., Osaka (JP)

(*) Notice: Subject to any disclaimer, the term of this patent is extended or adjusted under 35 U.S.C. 154(b) by 0 days.

(21) Appl. No.: 09/383,344

(22) Filed: Aug. 26, 1999

(51) Int. Cl.⁷ .................................................. F16L 27/12
(52) U.S. Cl. ........................ 285/145.3; 285/261; 285/302
(58) Field of Search ................................. 285/FOR 147, 285/FOR 148, 145.3, 261, 302

(56) References Cited

U.S. PATENT DOCUMENTS

| | | | |
|---|---|---|---|
| 5,160,176 | * 11/1992 | Gale ................................. | 285/145.3 |
| 5,740,839 | * 4/1998 | Kuo et al. ....................... | 285/145.3 |
| 5,897,146 | * 4/1999 | Saito et al. .................... | 285/145.3 |
| 6,056,329 | * 5/2000 | Kitani et al. ................... | 285/145.3 |

FOREIGN PATENT DOCUMENTS

| | | | |
|---|---|---|---|
| 2066399 | * 7/1981 | (GB) | ........................ 285/FOR 148 |
| 40-2271192 | * 11/1990 | (JP) | ............................ 285/FOR 147 |
| 8-121665 | 5/1996 | (JP). | |

* cited by examiner

*Primary Examiner*—Eric K. Nicholson
(74) *Attorney, Agent, or Firm*—Knobbe, Marten, Olson & Bear, LLP

(57) ABSTRACT

An expansion flexible tube joint comprising a first cylindrical body having a pair of spherical surface ring materials each formed with partially spherical outer surface, a second cylindrical body comprising a sleeve inserted into the first cylindrical body for relative movement thereof from an axial direction thereof, the sleeve provided at its end portion with stopper means for limiting extending and contracting movement relative to the first cylindrical body, and third cylindrical bodies fitted over both outer peripheral surfaces and comprising a pair of casing tubes each having slidable spherical inner peripheral surfaces and connection portions at opposite ends thereof, wherein an end inner peripheral surface of each of third cylindrical bodies at the thereof to which second cylindrical body is inserted is chamfered, and the chamfered angle is 16° or greater, and the stopper means is mounted to an outer peripheral surface of the second cylindrical body and is formed into a closed ring shape.

7 Claims, 7 Drawing Sheets

EXPANSION FLEXIBLE TUBE JOINT AND ASSEMBLING METHOD THEREOF

BACKGROUND OF THE INVENTION

1. Field of the Invention

The present invention relates to an expansion flexible tube joint and an assembling method thereof, and more particularly, to an expansion flexible tube joint which can be handled easily and is used for connecting water pipes, and because of its expanding flexibility, even when excessive external force is applied, the external force can be absorbed to prevent the tubes from being destroyed, and to an assembling method thereof.

2. Description of the Related Art

To already-existing tubes such as long water pipes provided on the ground or underground, various external forces such as compressing force, pulling force in the axial direction of the tube, or shearing force and bending moment in a direction perpendicular to the axial direction are applied due to ground subsidence or earthquake. If the external force is great, stress is concentrated on a tube joint which connects the already-existing tubes and the tube joint portion is destroyed. Therefore, it is necessary to absorb the external force applying to the water pipe portion to prevent the tube joint from being damaged.

Conventionally, a tube joint having a structure in which the tube joint itself can expand and contract is developed so as to absorb the external force to prevent the destruction. However, since this tube joint only move to expand and contract, the movable range is of two-dimensional, and this structure is not sufficient to cope with external force due to ground subsidence or earthquake.

To solve such a problem, there is developed a tube joint having a three-dimensional flexibility by employing a structure in which spherical surfaces are brought into contact with each other for sliding. In this case, as shown in FIG. 10, this expansion flexible tube joint A comprises a first cylindrical body 1, a second cylindrical body 2 and a third cylindrical body 3, and is connected to body tubes B at opposite flanges 6 through bolts 10 and nuts 11. The first cylindrical body 1 comprises a pair of spherical surface ring members 1, 1 made of cast iron and formed with partially spherical outer peripheral surface 4. The second cylindrical body 2 comprises a sleeve 2 made of cast iron and inserted into the first cylindrical body 1 for relative movement from an axis direction of the cylindrical body. The third cylindrical body 3 comprises a pair of casing tubes 3, 3 made of cast iron. The third cylindrical body 3 has an inner peripheral surface 5 for fitting over each of outer peripheral surfaces 4 of the first cylindrical body 1, and is formed at its opposite ends with flanges which are connecting portions. Because the expansion flexible tube joint A is formed in this manner, the sleeve 2, the spherical surface ring materials 1, 1 and two casing tubes 3, 3 are connected to one another such that they can extend and contract and move relative to one another. An end portion 3a of each of the casing tubes 3 is covered with a protective rubber cover 7, thereby preventing earth, sand, dust and the like from entering into sliding portions.

Further, an annular peripheral groove 1a is formed in an inner peripheral surface of the spherical surface ring material 1. An inner side of the annular peripheral groove 1a abuts against a C-shaped stainless steel lock-ring 17 having an angled cross section which is fitted and fixed to a recess formed in an outer peripheral surface of the sleeve 2 in the vicinity of its end. By this abutment, the relative movement range of the spherical surface ring material 1 and the sleeve 2 in the axial direction is limited. In FIG. 10, reference numbers 8 and 9 represent rubber seal rings.

In the case of this tube joint, when the outer peripheral surface 4 of the spherical surface ring material 1 swings while sliding on the inner peripheral surface of the casing tube 3, the outer peripheral surface of the sleeve 2 contact the end portion 3a of the casing tube 3 so that the swinging range is determined, but this range is set to a constant small angle range. That is, the inner peripheral surface of the end portion 3a of the casing tube 3 is chamfered off, and its angle is constantly set to 15° and therefore, the swinging range of the tube joint is limited to the constant value.

However, in order to cope with megaseism or change with time of ground subsidence, development of small expansion flexible tube joint having excellent extending and retracting flexibility and capable of strongly exhibiting its function even if great external force is applied is highly required.

SUMMARY OF THE INVENTION

Thereupon, the present inventor researched and make every endeavor to develop the expansion flexible tube joint over the years and as a result, they improved the conventional expansion flexible tube joint, and completed an expansion flexible tube joint which has greater extending and retracting flexibility, the size can be reduced, and which is strong against external force.

An expansion flexible tube joint of the present invention comprises a first cylindrical body having a pair of spherical surface ring materials each formed with partially spherical outer surface, a second cylindrical body comprising a sleeve inserted into the first cylindrical body for relative movement thereof from an axial direction thereof, the sleeve provided at its end portion with stopper means for limiting extending and contracting movement relative to the first cylindrical body, and third cylindrical bodies fitted over both outer peripheral surfaces and comprising a pair of casing tubes each having slidable spherical inner peripheral surfaces and connection portions at opposite ends thereof, wherein an end inner peripheral surface of each of the third cylindrical bodies at the side thereof to which the second cylindrical body is inserted is chamfered, and the chamfered angle is 16° or greater, and the stopper means is mounted to an outer peripheral surface of the second cylindrical body and is formed into a closed ring shape.

With this structure, the bending angle of the second cylindrical body can be increased as compared with the conventional tube joint, the overall length of the tube joint can be shortened accordingly, the size can be reduced, the producing cost is reduced, the weight is also reduced so that the assembling operation is facilitated. Further, even if great external force is applied, since stopper means is strengthened such that the stopper means have high resistance force, the stopper means does not come out from the second cylindrical body easily. Therefore, even if great external force such as earthquake is suddenly applied, the expanding and contracting flexibility of the tube joint can be maintained strongly.

As a result, according to the present invention, it was possible to provide a small expansion flexible tube joint which is strong against the external force and have greater expanding and contracting flexibility.

It is preferable that the chamfered angle is 16 to 20°, and the chamfered angle is set smaller as an inner diameter of the second cylindrical body is greater.

Usually, a packing is inserted into between sliding surfaces of the first and third cylindrical bodies to enhance the watertightness, but according to the above structure, if the bending angle of the second cylindrical body is increased, it is possible to reduce the possibility that the packing inserted into between sliding surfaces of the first and third cylindrical bodies comes out with the rotational movement of the second cylindrical body. If the chamfered angle exceeds 20°, there is a possibility that the packing may come out as the second cylindrical body rotates, which is not preferable.

It is preferable that the stopper means is formed into a closed ring shape by connecting a connection jig to a C-ring by fixing means.

With this structure, even if a great external force such as megaseism is applied to the tube joint, the stopper means can not easily come out from the second cylindrical body so that the entire tube joint can be strengthened, which is convenient.

It is preferable that the stopper means is formed into a closed ring shape by welding a C-ring.

With this structure also, the stopper means can not easily come out from the second cylindrical body so that the entire tube joint can be strengthened, which is convenient. Further, since the efficiency of the welding operation is high, there is a merit that the operation is facilitated.

Further, an assembling method of the invention of an expansion flexible tube joint comprising first and second cylindrical bodies slidably fitted to each other in an axial direction thereof, and the sliding movement range of the first and second cylindrical bodies in the axial direction being limited by a groove peripheral surface of an annular peripheral groove formed in an inner peripheral surface of the first cylindrical body and stopper means mounted and fixed to an outer peripheral surface of the second cylindrical body, the assembling method comprises steps of: forming a notched portion in the inner peripheral surface of the first cylindrical body for bringing the annular peripheral groove and an outer peripheral surface of the first cylindrical body, and inserting the C-ring shaped stopper member which is cut at one portion in its peripheral direction and can be deformed in its diametrical direction into the annular peripheral groove which is formed deeper than a thickness of the stopper member in its diametrical direction; inserting the second cylindrical body into the first cylindrical body to which the stopper member is inserted; relatively moving the stopper member in the axial direction along the outer peripheral surface of the second cylindrical body which is inserted into the first cylindrical body while resiliently deforming the stopper member in a direction to increase its diameter in the annular groove, thereby fitting the stopper member in a recess groove formed in the outer peripheral surface of the second cylindrical body; and connecting the cut portion formed in a circumferential direction of the stopper member.

With this method, in order to cope with megaseism or change with time of ground subsidence, small expansion flexible tube joint having excellent extending and retracting flexibility and capable of strongly exhibiting its function even if great external force is applied is highly required could be provided.

It is preferable that the connecting step of the cut portion of the stopper member is carried out by screwing through a plate member.

With this method, since the connection operation is easy, it is convenient when the operation is carried out in the field.

It is preferable that the connecting step of the cut portion of the stopper member is carried out by welding.

With this method, since the operation property is excellent, the efficiency of the operation can be enhanced, which is convenient.

BRIEF DESCRIPTION OF THE DRAWINGS

FIG. 2 are side views showing stopper means, wherein

FIG. 8 are views for explaining a mounting method of the stopper means shown in FIG. 7, wherein

DETAILED DESCRIPTION OF THE PREFERRED EMBODIMENTS

Embodiments of an expansion flexible tube joint of the present invention will be explained in detail with reference to the drawings.

Figure 1:
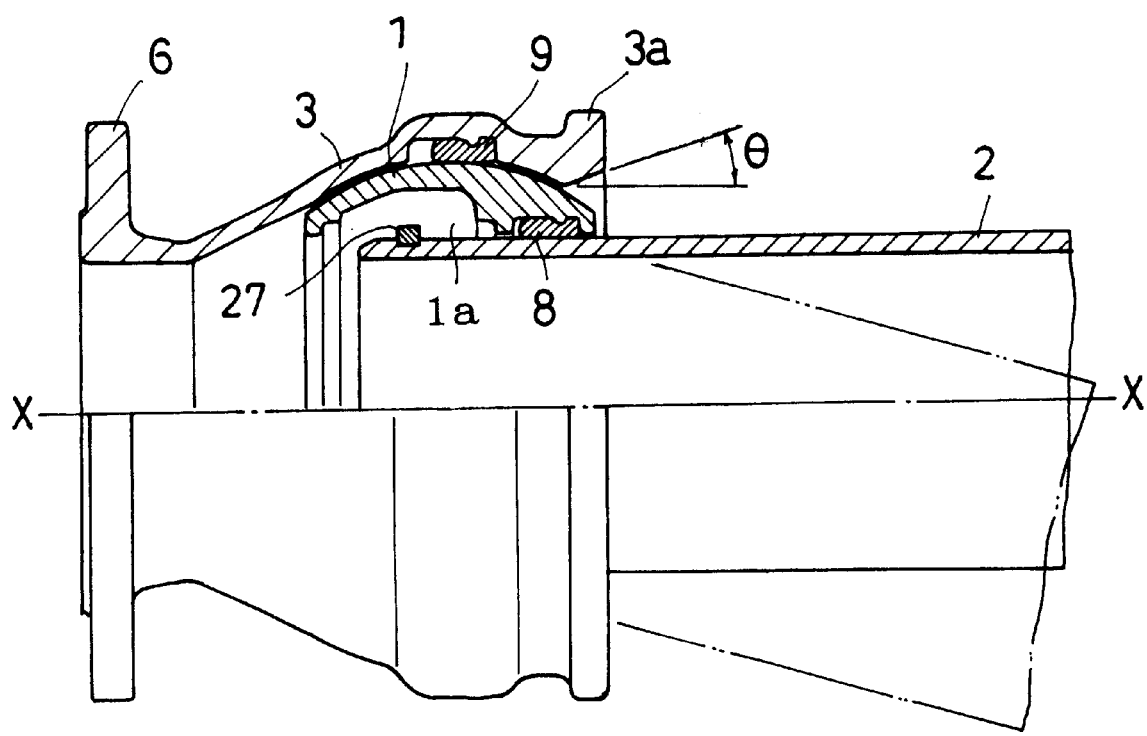
FIG. 1 is a partial front sectional view of an expansion flexible tube joint of the present invention.
Figure 10:
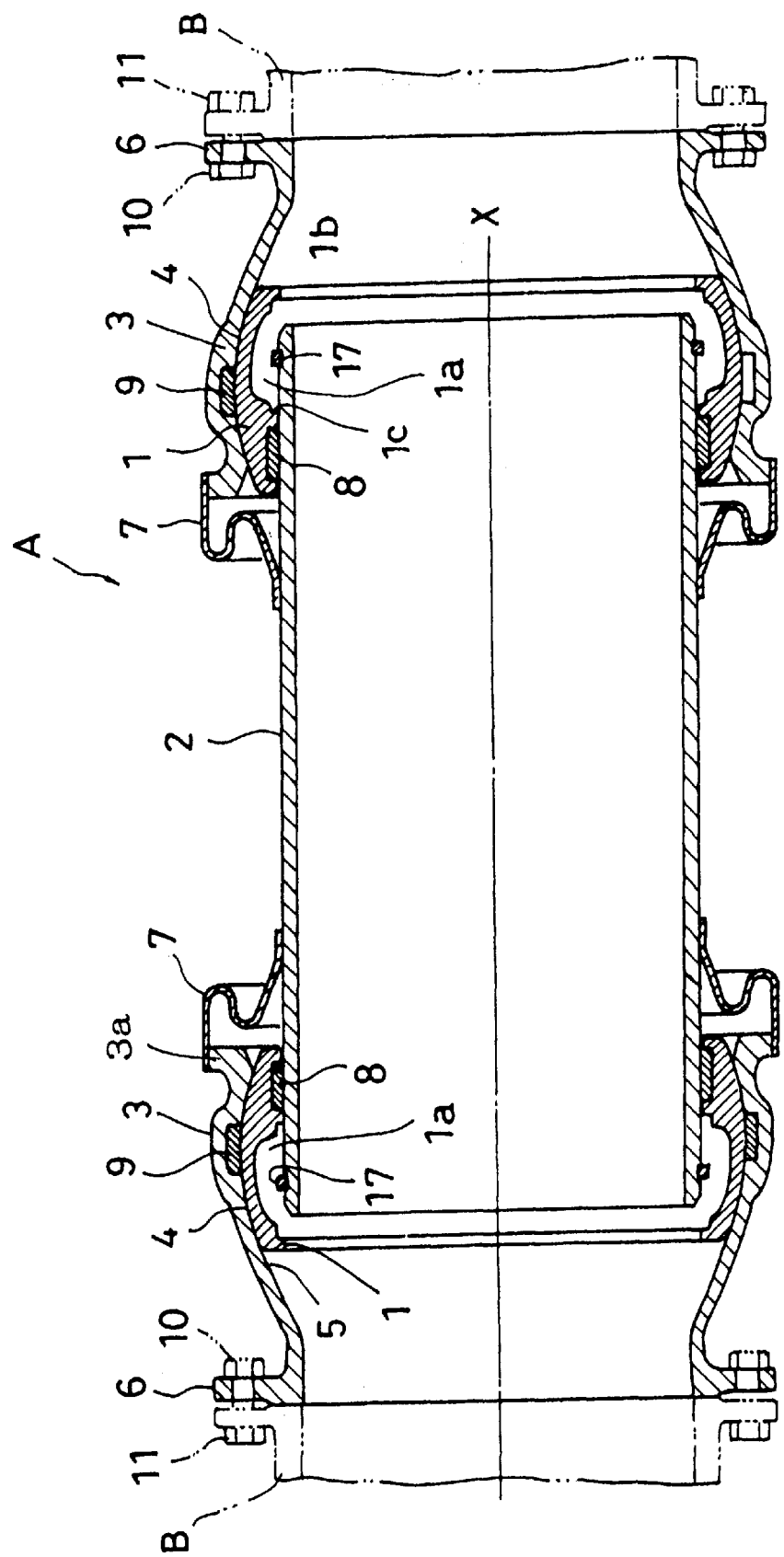
FIG. 10 is a front sectional view of a conventional expansion flexible tube joint.

FIG. 1 is a partial front sectional view of an expansion flexible tube joint of the invention. In FIG. 1, members having the same functions as those shown in FIG. 10 are designated by the same reference symbols. Since the expansion flexible tube joint of the present embodiment is laterally symmetrical, only one of the sides is shown in FIG. 1.

This expansion flexible tube joint A comprises a first cylindrical body 1, a second cylindrical body 2 and a third cylindrical body 3, and is connected to flanges 6 provided on opposite ends of a body tube (not shown) by bolts (not shown) and nuts (not shown). The first cylindrical body 1 comprises a spherical surface ring member 1 made of cast iron and formed with partially spherical outer peripheral surface 4. The second cylindrical body 2 comprises a sleeve 2 made of cast iron and inserted into the first cylindrical body 1 for relative movement from an axis direction of the cylindrical body. The third cylindrical body 3 comprises a casing tube 3 made of cast iron. The third cylindrical body 3 has an inner peripheral surface 5 for fitting over each of outer peripheral surfaces 4 of the first cylindrical body 1, and is formed at its opposite ends with flanges 6 which are connecting portions. The flanges 6 may not necessarily be formed at the opposite ends of the casing tube 3, and the casing tube 3 is formed into a merely tube in some cases. Because the expansion flexible tube joint A is formed in this manner, the sleeve 2, the spherical surface ring material 1, and the casing tube 3 are connected to one another such that they can extend and contract and swing relative to one another. An end portion 3a of the casing tube 3 is covered with a protective rubber cover (not shown).

Further, an annular peripheral groove 1a is formed in an inner peripheral surface of the spherical surface ring material 1. An inner side of the annular peripheral groove 1a abuts against a stainless steel lock-ring 27 as stopper means having an angled cross section which is fitted and fixed to a recess formed in an outer peripheral surface of the sleeve 2 in the vicinity of its end. By this abutment, the relative movement range of the spherical surface ring material 1 and the sleeve 2 in the axial direction is limited. Rubber seal rings 8 and 9 are interposed between the spherical surface ring material 1, the sleeve 2 and the casing tube 3. This lock-ring 27 is different from the C-shaped lock-ring partially having notch shown in FIG. 10, and is formed into a closed O-shaped.

An inner peripheral surface of the end portion 3a of the casing tube 3 is chamfered, and the chamfer angle θ is 18° with respect to a horizontal plane. By forming such a chamfer angle, it is possible to increase the rotation angle of the sleeve 2 and therefore, the overall length of the tube joint securing the same deviation amount (subsidence amount) can be shortened. For example, in the case of a sleeve having nominal size of 75 mm Φ, the overall length of 1,530 mm was necessary for the conventional tube joint, but in the present embodiment, the overall length was 1,150 mm. Therefore, the entire tube joint could be reduced in size, the material cost could be reduced, and the weight could also be reduced.

It is preferable that the relation between the nominal size of the sleeve and the chamfer angle is set such that the chamfer angle is reduced as the nominal size is greater. This is because that if the rotation angle of the sleeve 2 is increased as the sleeve rotates, the spherical surface ring 1 is prone to come out and thus, it is preferable that the chamfer angle is increased within a range that the spherical surface ring 1 does not come out.

Figure 2A:
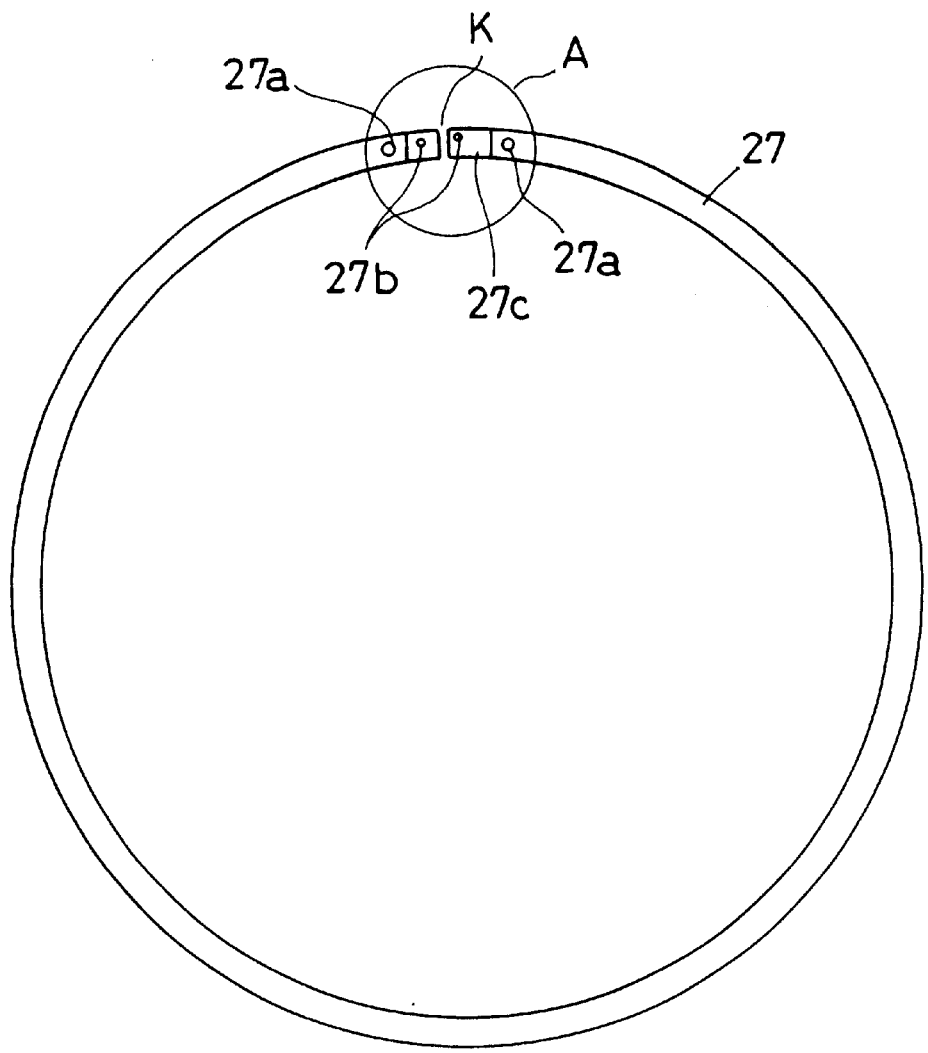
FIG. 2(a) shows the entire structure.
Figure 2B:
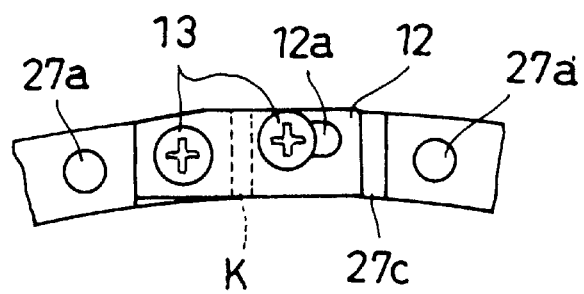
FIG. 2(b) shows a portion A in FIG. 2(a) in enlarged scale.

The lock-ring 27 will be explained. As shown in FIG. 2(*a*), the lock-ring 27 is formed with screw holes 27b at left and right opposite sides in the vicinity of a cut portion K of the lock-ring, and holes 27a at left and right outer sides in which tip ends of an assembling jig which will be described later can be inserted. Among them, the screw holes 27b are formed in recesses 27c which reduce the thickness of the lock-ring 27. FIG. 2(*b*) shows a portion A (cut portion) in FIG. 2(*a*) in an enlarged scale. As shown in FIG. 2(*b*), a plate member 12 formed with two screw holes 12a is fitted into the recess 27c of the lock-ring 27, screws 13 are inserted and fixed to screw holes 27b and 12a, thereby connecting the cut portion K of the lock-ring 27. As a result, the lock-ring 27 of the present embodiment assumes a closed O-ring shape. The plate member 12 is formed with at least one elongated hole 12a among holes for fixing the screw 13 so that it is easy to screw.

If the lock-ring 27 is formed into the closed O-ring shape in this manner, its strength is remarkably enhanced as compared with the conventional C-ring shaped lock-ring, and even if a great external force such as megaseism is applied to the tube joint, the lock-ring should not come out from the sleeve 2, and when the present tube joint is used in a water pipe, watertightness is maintained which is preferable.

Next, an assembling method of the expansion flexible tube joint will be explained.

Figure 3:
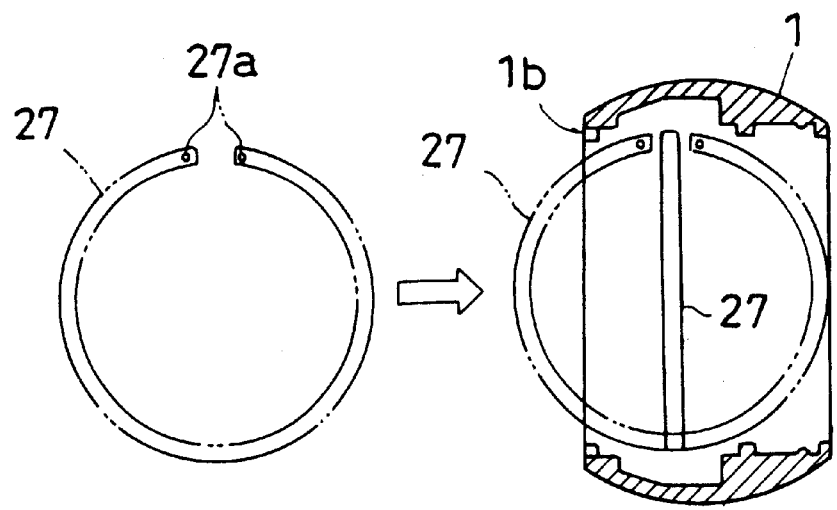
FIGS. 3 to 6 are views for explaining assembling method of the expansion flexible tube joint of the invention.

As shown in FIG. 3, the C-ring shaped resiliently deformable lock-ring 27 is inserted in the notched portion 1b such that the diametric direction of the lock-ring 27 lies along the axial direction of the spherical surface ring material 1. After the lock-ring 27 is inserted in the annular peripheral groove 1a, the lock-ring 27 is rotated within the annular peripheral groove 1a such that the lock-ring 27 assumes a position which is coaxial with the spherical surface ring material 1.

Figure 4:
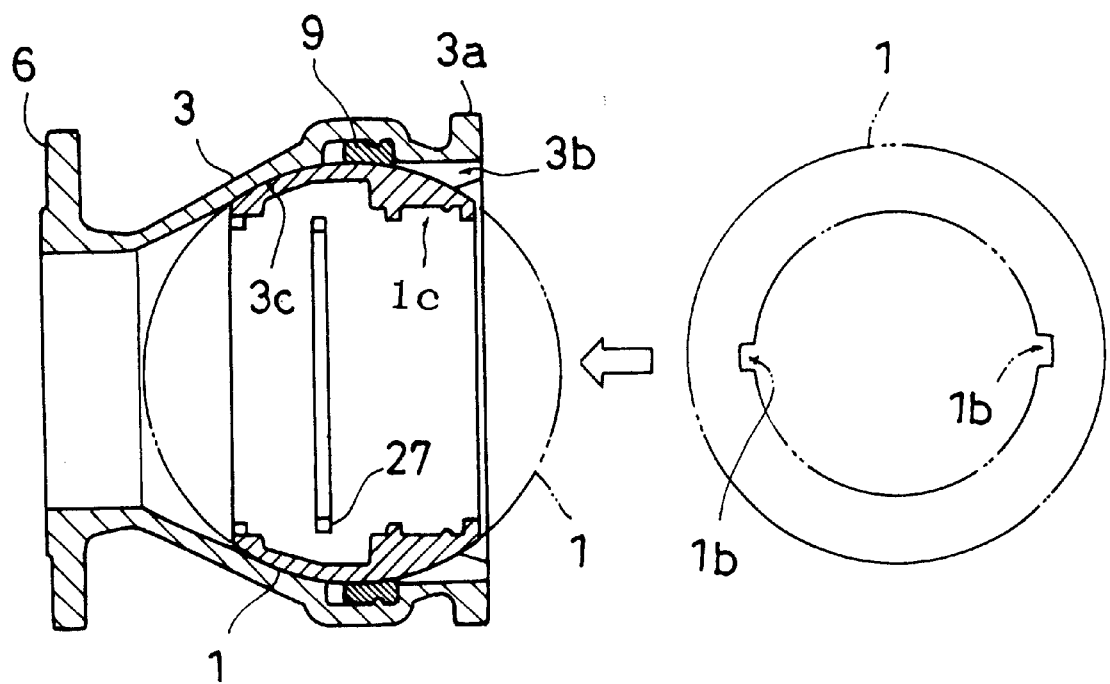

Next, as shown in FIG. 4, a packing 9 is fitted to the casing tube 3, an appropriate amount of lubricant is applied to peripheral surfaces of the spherical surface ring material 1 and the packing 9 in which the lock-ring 27 is inserted, spherical surface ring material 1 is inserted to the notched portion 3b such that the diametric direction of the lock-ring 27 lies along the axial direction of the casing tube 3, the spherical surface ring material 1 is turned while allowing the same to slide with the spherical inner peripheral surface 3c, and the attitude of the spherical surface ring material 1 is changed to be coaxial with the casing tube 3.

An engaging groove 1c of the spherical surface ring material 1 is positioned at upper portion in the insertion direction of the spherical surface ring material 1, and the packing 8 is inserted to the engaging groove 1c.

Figure 5:
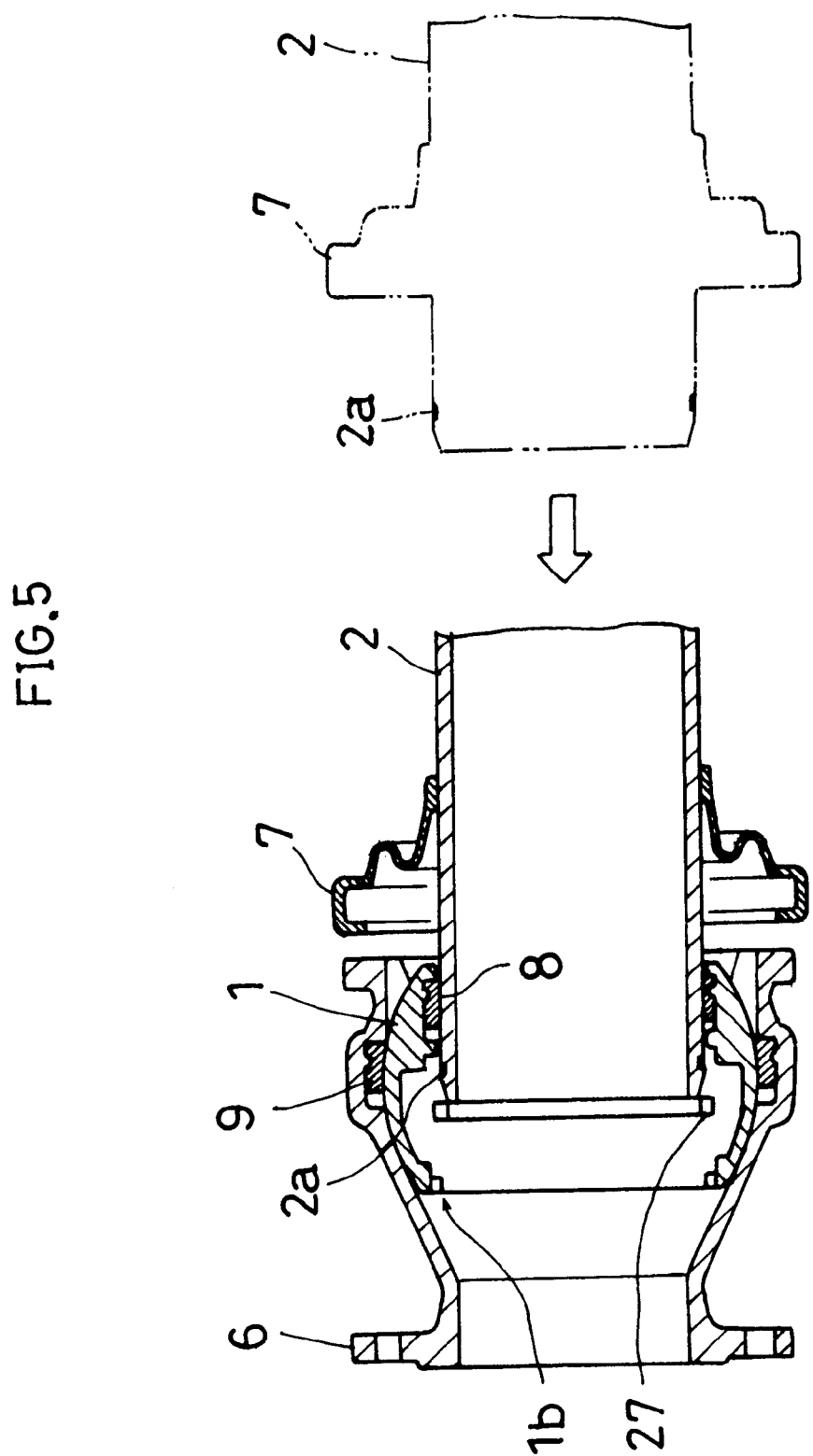

Further, as shown in FIG. 5, an appropriate amount of lubricant is applied to peripheral surfaces of the packing 8 and the sleeve 2. Next, using a lever block, pulling bolt or the like, the sleeve 2 is inserted in the inner peripheral surface of the spherical surface ring material 1.

Figure 6:
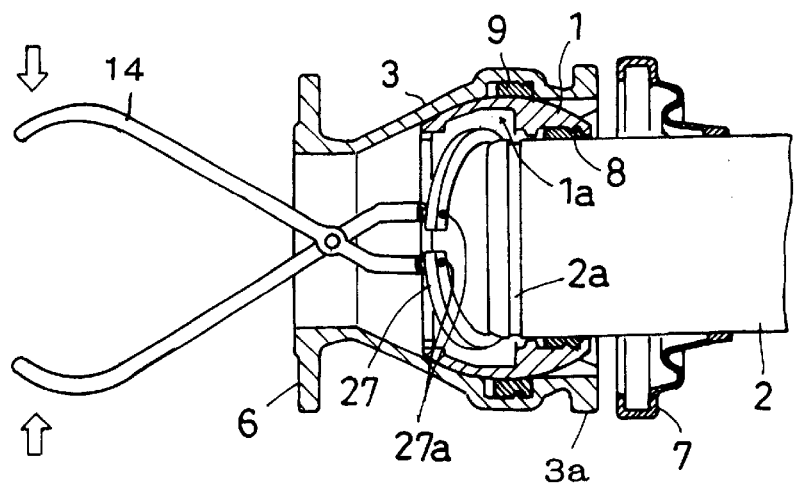

Further, as shown in FIG. 6, a jig 14 is inserted from an opening closer to an expanded portion 6 of the casing tube 3, tip ends of the jig 14 are hitched to holes 27a formed in opposite ends of the lock-ring 27. Then, the lock-ring 27 is held by the jig 14 while being resiliently deformed in a direction to increase its diameter, and is moved along the outer peripheral surface of the sleeve 2, and is fitted and fixed to a recess groove 2a.

Then, the plate member 12 is connected between the opposite ends of the lock-ring 27 through screws 13.

Lastly, the rubber cover 7 is fitted over the casing tube 3 to complete the assembling.

[Another Embodiments of the Invention]

Figure 7:
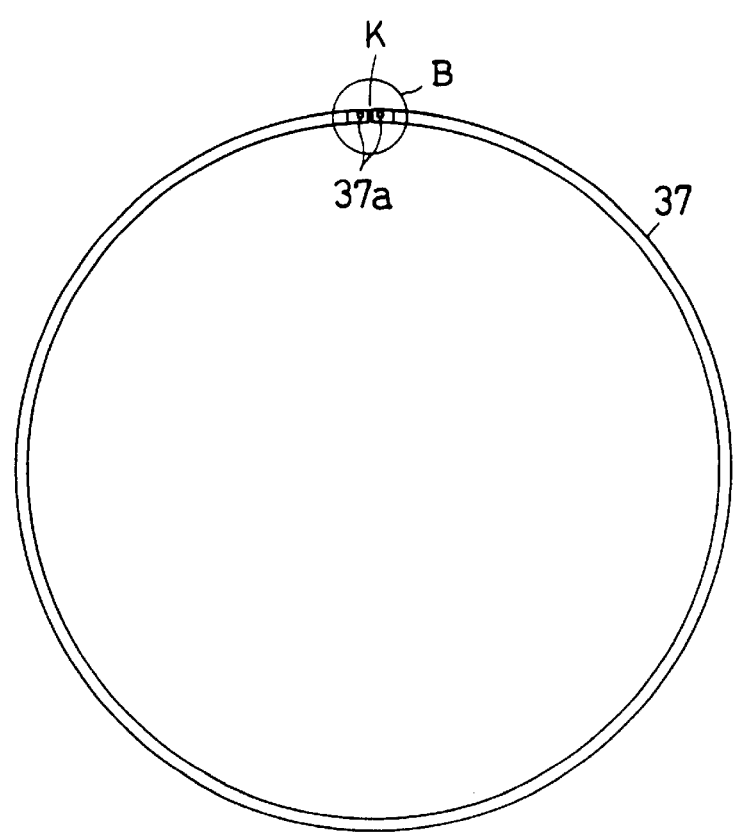
FIG. 7 is a side view showing stopper means of another embodiment.
Figure 8A:
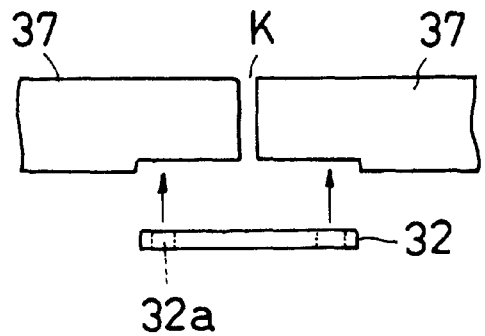
FIG. 8(a) is a plan view.
Figure 8B:
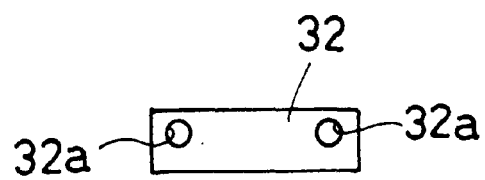
FIG. 8(b) is a side view of a plate member used for mounting the stopper means.

(a) FIG. 7 shows a lock-ring 37 of another embodiment. Like the above-described lock-ring 27, this lock-ring 37 is formed with holes 37a at left and right opposite sides in the vicinity of a cut portion K of the lock-ring 37, holes 37a in which tip ends of an assembling jig can be inserted. Further, FIG. 8(*a*) shows a portion B in FIG. 7 in an enlarged scale. As shown in FIG. 8(*a*), recesses 37b which reduces the thickness of lock-ring 37 is formed. As shown in FIG. 8(*b*), a welding plate member 32 formed with two welding holes 32a is fitted into the recess 37b, the welding holes 32a are welded while inserting welding wires, and the cut portion K of the lock-ring 37 is connected together with the welding plate member 32. Not only the welding holes 32a, but also peripheral portions to which the welding plate members 32 are fitted may be welded. This welding operation may be carried out after the lock-ring 37 is fitted to the outer peripheral surface of the sleeve 2 as described in the assembling method of the expansion flexible tube joint.

Figure 9:
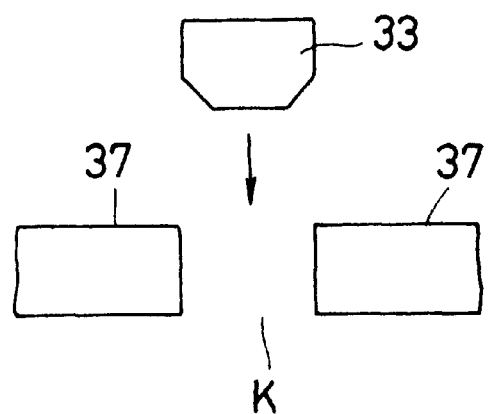
FIG. 9 is a plan view showing a modification of the stopper means.

(b) Further, FIG. 9 shows a modification in which the cut portion K of the lock-ring 37 is connected by welding. In this modification, a spacer member 33 having a width slightly smaller than a gap of the cut portion K of the lock-ring 37 is inserted into the gap of the cut portion K. That is, insertion peripheral portion of the spacer member 33 is welded to connect the cut portion K of the lock-ring 37 together with the spacer member 33. Two corners of the spacer member 33 are chamfered, and these portions form an tip opening structure. That is, as shown in FIG. 9, the spacer member 33 is fitted to the cut portion K, and the two corners are welded in the vertical direction with respect to the sheet. With this modification, the lock-ring can be strengthened as in the above other embodiment.

What is claimed is:

1. An expansion flexible tube joint comprising
   a first cylindrical body having a spherical surface ring material formed with a partially spherical outer peripheral surface,
   a second cylindrical body comprising a sleeve inserted into said first cylindrical body for relative movement thereof from an axial direction thereof, said sleeve provided at its end portion with a stopper for limiting extending and contracting movement relative to said first cylindrical body, and a third cylindrical body of a single integrated piece having two ends, one end being chamfered, the other end being adapted to be connected to a main tube, said third cylindrical body comprising a casing tube having a partially spherical inner peripheral surface onto which the partially spherical outer peripheral surface of the first cylindrical body is slidably fitted, wherein the chamfered end has a chamfered angle of 16° or greater with respect to an axis of the third cylindrical body, wherein the second cylindrical body can be tilted up to the chamfered angle, the casing tube has, along the partially spherical inner peripheral surface, a thickness greater near the chamfered end than away from the chamfered end, and said stopper is mounted to an outer peripheral surface of said second cylindrical body and is a closed ring.

2. An expansion flexible tube joint according to claim 1, wherein said chamfered angle is 16 to 20°, and said chamfered angle is set smaller as an inner diameter of said second cylindrical body is greater.

3. An expansion flexible tube joint according to claim 1, wherein said stopper means is formed into a closed ring shape by connecting a connection jig to a C-ring by fixing means.

4. An expansion flexible tube joint according to claim 1, wherein said stopper means is formed into a closed ring shape by welding a C-ring.

5. An assembling method of an expansion flexible tube joint comprising: (i) first and second cylindrical bodies slidably fitted to each other in an axial direction thereof, and the sliding movement range of said first and second cylindrical bodies in the axial direction being limited by abutting of a groove peripheral surface of an annular peripheral groove formed in an inner peripheral surface of said first cylindrical body against a closed-ring stopper mounted and fixed to a recess groove formed on an outer peripheral surface of said second cylindrical body, said inner peripheral surface of the first cylindrical body having notched portions for inserting an open-ring stopper sideways therethrough; and (ii) a third cylindrical body of a single integrated piece comprising a casing tube fitted over an outer peripheral surface of said first cylindrical body and having a spherical inner peripheral surface on which the outer peripheral surface of said first cylindrical body is slidable, said third cylindrical body having a chamfered end and at the chamfered end an inner peripheral surface having notched portions for inserting the first cylindrical body sideways therethrough, said assembling method comprising steps of:

inserting an open-ring stopper which can be deformed in its diametrical direction, sideways through the notched portions, and then positioning the ring stopper coaxially with an axis of the first cylindrical body;

inserting said first cylindrical body enclosing the open-ring stopper sideways through the notched portions of the inner peripheral surface of said third cylindrical body from the chamfered end, and then positioning said first cylindrical body coaxially with an axis of said third cylindrical body;

inserting said second cylindrical body into said first cylindrical body from the chamfered end;

increasing the diameter of the open-ring stopper with a tool and placing the open-ring stopper in the recess groove of said second cylindrical body; and closing the open-ring stopper.

6. An assembling method of an expansion flexible tube joint according to claim 5, wherein said connecting step of said cut portion of said stopper member is carried out by screwing through a plate member.

7. An assembling method of an expansion flexible tube joint according to claim 5, wherein said connecting step of said cut portion of said stopper member is carried out by welding.

* * * * *